(12) United States Patent
Favor et al.

(10) Patent No.: US 12,001,843 B2
(45) Date of Patent: Jun. 4, 2024

(54) MICROPROCESSOR INCLUDING A DECODE UNIT THAT PERFORMS PRE-EXECUTION OF LOAD CONSTANT MICRO-OPERATIONS

(71) Applicant: Ventana Micro Systems Inc., Cupertino, CA (US)

(72) Inventors: John G. Favor, San Francisco, CA (US); David S. Oliver, Providence, UT (US)

(73) Assignee: Ventana Micro Systems Inc., Cupertino, CA (US)

( * ) Notice: Subject to any disclaimer, the term of this patent is extended or adjusted under 35 U.S.C. 154(b) by 7 days.

(21) Appl. No.: 17/945,492

(22) Filed: Sep. 15, 2022

(65) Prior Publication Data
US 2024/0103864 A1    Mar. 28, 2024

(51) Int. Cl.
*G06F 9/30*    (2018.01)
*G06F 9/38*    (2018.01)

(52) U.S. Cl.
CPC ...... *G06F 9/30145* (2013.01); *G06F 9/30043* (2013.01); *G06F 9/30141* (2013.01); *G06F 9/3836* (2013.01)

(58) Field of Classification Search
CPC ............. G06F 9/30043; G06F 9/30141; G06F 9/30145; G06F 9/3836
See application file for complete search history.

(56) References Cited

U.S. PATENT DOCUMENTS

| | | | |
|---|---|---|---|
| 11,126,588 B1 * | 9/2021 | Heo | G06F 9/30141 |
| 11,163,571 B1 * | 11/2021 | Barrick | G06F 9/30181 |
| 2004/0024989 A1 * | 2/2004 | Chauvel | G06F 9/30134 |
| | | | 711/E12.04 |
| 2013/0339671 A1 * | 12/2013 | Williams, III | G06F 9/3838 |
| | | | 712/E9.023 |
| 2015/0186148 A1 * | 7/2015 | Brooks | G06F 9/48 |
| | | | 712/206 |
| 2020/0065107 A1 * | 2/2020 | Underwood | G06F 9/3814 |
| 2021/0165654 A1 * | 6/2021 | Carlson | G06F 9/3013 |
| 2022/0050679 A1 * | 2/2022 | Lloyd | G06F 9/3853 |
| 2022/0050684 A1 * | 2/2022 | Orzol | G06F 9/3836 |

* cited by examiner

*Primary Examiner* — Jacob Petranek
(74) *Attorney, Agent, or Firm* — E. Alan Davis; Huffman Law Group, PC

(57) ABSTRACT

A microprocessor includes a decode unit that maps architectural instructions into micro-operations and dispatches them to a scheduler that issues them to execution units that execute them by reading source operands from a register file and writing execution results to the register file. An architectural instruction instructs the microprocessor to load a constant into an architectural destination register. The decode unit maps the architectural instruction into a load constant micro-operation (LCM) and writes the LCM constant directly to a register of the register file without dispatching the LCM to the scheduler, such that the LCM is not issued to the execution units. In the same clock cycle, the decode unit indicates the LCM constant is available for consumption, such that the LCM imposes zero execution latency on dependent micro-operations and dispatches to the scheduler micro-operations other than the LCM. The register file may include a decode unit-dedicated write port.

35 Claims, 2 Drawing Sheets

MICROPROCESSOR INCLUDING A DECODE UNIT THAT PERFORMS PRE-EXECUTION OF LOAD CONSTANT MICRO-OPERATIONS

BACKGROUND

Generally speaking, the design of a microprocessor often involves two competing goals, namely to execute programs with high performance and low power consumption. Performance is measured by the time required to process the instructions of the program. Instructions typically consume source operands to produce a result, or destination operand. Typically, the processor includes registers from which the source operands are read and to which the destination operand is written. Typically, this causes a dependency of an instruction on an earlier instruction in the program order. That is, the dependent instruction needs for its source operand the destination operand produced by the earlier instruction. In particular, the dependent instruction must wait to read its source operand until the earlier instruction writes its result to the register. The number of clock cycles the dependent instruction must wait is a function of the number of clock cycles the earlier instruction takes to make its result is available, which is typically referred to as the execution latency of the earlier instruction. Generally speaking, larger instruction execution latencies negatively affect performance.

For this reason, microprocessor designers look for ways to reduce execution latency. One example of a solution is a bypass bus from which the dependent instruction may read the earlier instruction result, rather than reading the result from the destination register of the earlier instruction. Another example solution is shortening the pipeline of an execution unit that executes the earlier instruction. For example, microprocessor designers strive to reduce the length of load unit pipelines in order to minimize the load-to-use latency of load instructions that load an operand from memory into a register.

Another feature of many high-performance microprocessors is that they are superscalar, i.e., they have multiple execution units to which multiple instructions may be issued for execution in parallel in a given clock cycle. When an execution unit executes an instruction, the instruction is said to consume the execution unit's bandwidth. Generally speaking, during many time segments of the course of execution of a program, the bandwidth of all the execution units is being consumed such that other instructions are waiting for an execution unit to become free. Thus, execution bandwidth is also a limiting factor in microprocessor performance. One example of a solution is instruction fusion in which the microprocessor fuses multiple architectural instructions into a single micro-operation that is issued to an execution unit for execution. In this way, instruction fusion may reduce execution bandwidth.

SUMMARY

In one embodiment, the present disclosure provides a microprocessor having an instruction set architecture (ISA). The microprocessor includes a register file and a decode unit configured to map architectural instructions of the ISA into micro-operations and to dispatch the micro-operations to a scheduler. The scheduler is configured to issue the micro-operations to execution units for execution. The execution units are configured to execute the issued micro-operations by reading source operands from the register file and writing execution results to the register file. The ISA includes an architectural instruction that instructs the microprocessor to load a constant into an architectural destination register. The decode unit is further configured to map the architectural instruction into a load constant micro-operation (LCM) that specifies the constant and a register of the register file to which the architectural destination register is mapped and write the LCM constant directly to a register of the register file without dispatching the LCM to the scheduler, such that the LCM is not issued to the execution units for execution.

In another embodiment, the present disclosure provides a method for use in a microprocessor having an instruction set architecture (ISA) that includes an architectural instruction that instructs the microprocessor to load a constant into an architectural destination register. The microprocessor includes a register file and a decode unit configured to map architectural instructions of the ISA into micro-operations and to dispatch the micro-operations to a scheduler. The scheduler is configured to issue the micro-operations to execution units for execution. The execution units are configured to execute the issued micro-operations by reading source operands from the register file and writing execution results to the register file. The method includes mapping, by the decode unit, the architectural instruction into a load constant micro-operation (LCM) that specifies the constant and a register of the register file to which the architectural destination register is mapped, and writing, by the decode unit, the LCM constant directly to a register of the register file without dispatching the LCM to the scheduler, such that the LCM is not issued to the execution units for execution.

In yet another embodiment, the present disclosure provides a non-transitory computer-readable medium having instructions stored thereon that are capable of causing or configuring a microprocessor having an instruction set architecture (ISA). The microprocessor includes a register file and a decode unit configured to map architectural instructions of the ISA into micro-operations and to dispatch the micro-operations to a scheduler. The scheduler is configured to issue the micro-operations to execution units for execution. The execution units are configured to execute the issued micro-operations by reading source operands from the register file and writing execution results to the register file. The ISA includes an architectural instruction that instructs the microprocessor to load a constant into an architectural destination register. The decode unit is further configured to map the architectural instruction into a load constant micro-operation (LCM) that specifies the constant and a register of the register file to which the architectural destination register is mapped and write the LCM constant directly to a register of the register file without dispatching the LCM to the scheduler, such that the LCM is not issued to the execution units for execution.

DETAILED DESCRIPTION

Figure 1:
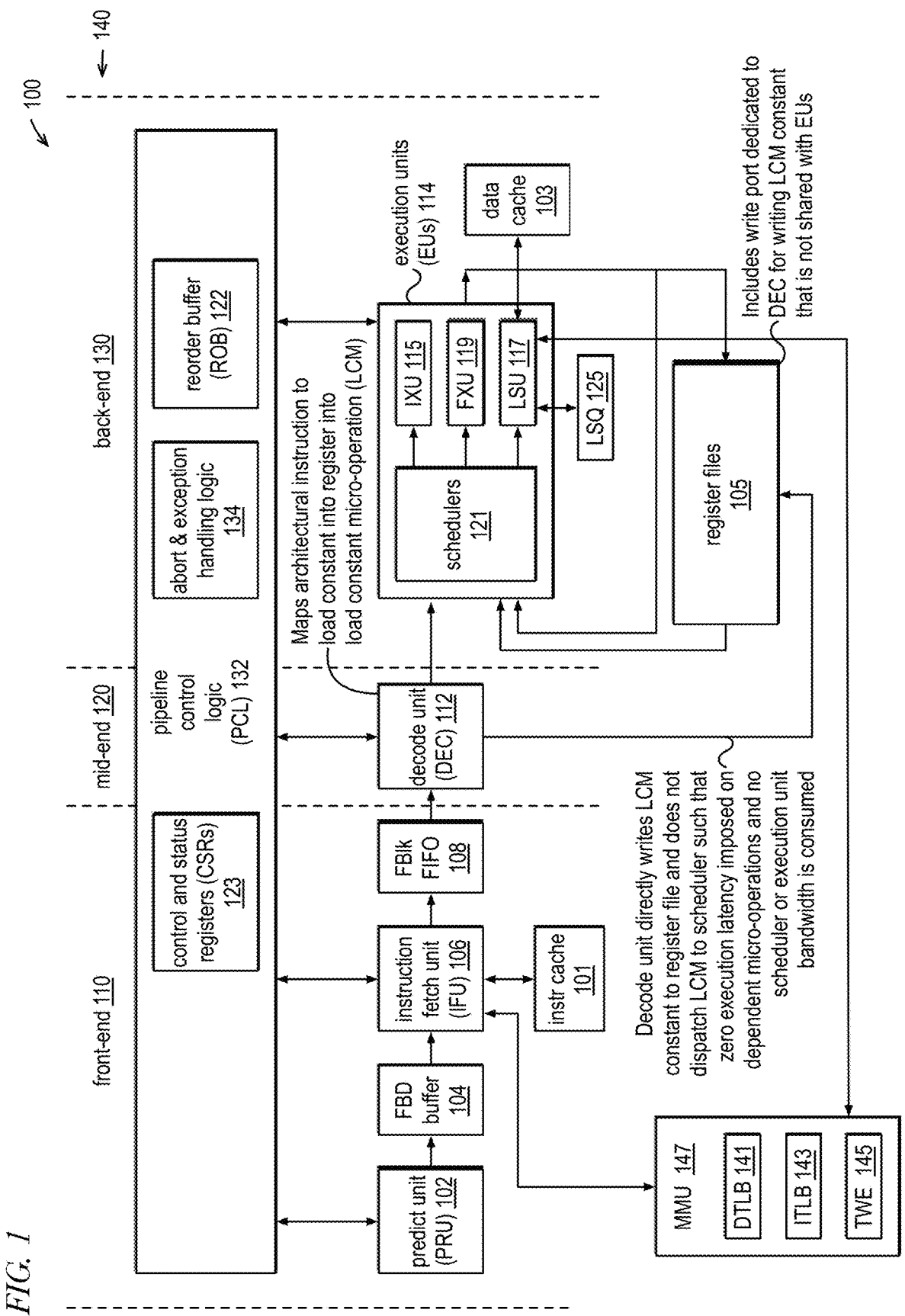
FIG. 1 is an example block diagram of a pipelined super-scalar, out-of-order execution microprocessor core that performs speculative execution of instructions in accordance with embodiments of the present disclosure.

FIG. 1 is an example block diagram of a pipelined super-scalar, out-of-order execution microprocessor core 100 that performs speculative execution of instructions in accordance with embodiments of the present disclosure. The core 100 includes a decode unit that performs pre-execution of a load constant micro-operation (LCM) to accomplish zero execution latency and zero execution bandwidth consumption as described herein. Although a single core 100 is shown, the LCM pre-execution techniques described herein are not limited to a particular number of cores. Generally, the LCM pre-execution embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the LCM pre-execution embodiments are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, register files 105, a plurality of execution units (EU) 114, and load and store queues (LSQ) 125. In one embodiment, the EUs 114 include integer execution units (IXU) 115, floating point units (FXU) 119, and a load-store unit (LSU) 117. In one embodiment, the EUs 114 include four IXU 115 for executing up to four Ops in parallel, two FXU 119, and an LSU 117 that is capable of executing up to four load/store Ops in parallel. In one embodiment, the register files 105 include an integer register file, a floating-point register file and a vector register file. The register files 105 store the state of architectural registers. Because the core 100 performs speculative execution, some of the registers in the register file 105 may be in a committed state, whereas some of the registers in the register file 105 may be in a speculative state. Each register file 105 includes read ports used by execution units 114 to read source operands from the register file 105 and write ports used by execution units 114 to write execution results to the register file 105. In one embodiment, one or more of the register files 105 also includes one or more write ports dedicated to the DEC 112 to enable the DEC 112 to perform LCM pre-execution by writing a constant, also referred to as an immediate, to the register file 105 as described in more detail below. The LSQ 125 holds speculatively executed load/store micro-operations, also referred to as Ops, until they are committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 during decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145 to provide virtual memory support. The core 100 may also provide machine virtualization support. Finally, the core 100 may provide different privilege modes, or privilege levels.

The microprocessor 110 may also include other blocks not shown, such as a load buffer, a bus interface unit, and various levels of cache memory above the instruction cache 101 and data cache 103, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

Pipeline control logic (PCL) 132 is coupled to and controls various aspects of the pipeline 140 which are described in detail herein. The PCL 132 includes a ReOrder Buffer (ROB) 122, abort and exception-handling logic 134, and control and status registers (CSR) 123. The CSRs 123 may hold, among other things, the privilege mode, virtual machine identifier, and address space identifier of the core 100.

The PRU 102 maintains the program counter (PC) and includes predictors that predict program flow that may be altered by control flow instructions, such as branch instructions, e.g., a branch target buffer, conditional branch predictor, indirect branch predictor, and return address predictor. As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, a branch instruction that does not need to be predicted (e.g., a PC-relative unconditional branch), or an instruction that causes a PM change or that requires heavy abort-based synchronization (aka "stop" instruction). Additionally, the FBlk may include run of instructions that continues sequentially into the next FBlk, in which case the FBlk may end with any type of instruction, and the FBlk includes an indication that the FBlk is a sequential type FBlk. An FBD is essentially a request to fetch a block of sequential instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. By design, the last instruction of an FBlk can be a branch instruction, a privilege-mode-changing instruction, or a stop instruction. Instructions may travel through the pipeline 140 from the IFU 106 to the DEC 112 as FBlks, where multiple instructions may be decoded in parallel.

The DEC 112 extracts architectural instructions of the FBlks and maps them into micro-operations, also referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive source operands for the Ops from multiple sources including the register files 105 and forwarding busses—also referred to as result busses or bypass busses—the directly forward results produced by the EUs 114 back to the EUs 114.

The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups.

Each OpGroup consists of either four sequential Ops or, if there are fewer than four Ops in the FBlk after all possible four-op OpGroups for an FBlk have been formed, the remaining Ops of the FBlk.

Because some Ops can be fused from two instructions, an OpGroup may correspond to up to eight instructions. The Ops of the OpGroup may be processed in simultaneous clock cycles through later DEC 112 pipe stages and dispatched to the scheduler 121 for subsequent issue to execution units 114 for execution. Instructions of an OpGroup are also allocated into the ROB 122 in simultaneous clock cycles and in program order. The micro-operations of an OpGroup are not, however, necessarily scheduled for execution together. As described herein, the DEC 112 is configured to map certain architectural instructions (or combinations of architectural instructions) into an LCM that specifies the constant and a destination register of the register file 105 to which the destination register specified by the architectural instruction is renamed, or mapped, and write the constant specified by the architectural instruction(s) to the register file 105, thereby advantageously accomplishing zero execution latency and consuming no bandwidth of the EUs 114 and scheduler 121 to process the architectural instruction(s), which may improve program execution performance.

In one embodiment, each of the EUs 114 includes a dedicated scheduler 121. In an alternate embodiment, a scheduler 121 common to all the EUs 114 (and integrated with the ROB 122 according to one embodiment) serves all the EUs 114. In one embodiment, each scheduler 121 includes an associated buffer (not shown) that receives Ops dispatched by the DEC 112. The scheduler 121 issues the Op to the relevant EU 114 pipeline for execution, namely when all source operands upon which the Op depends are available (also referred to as "ready") for execution and an EU 114 pipeline of the appropriate type to execute the Op is available. However, the DEC 112 pre-executes LCMs—by writing the constant/immediate directly to the register file 105—rather than dispatching them to the scheduler 121 such that the LCMs are advantageously not issued to an EU 114 for execution, which may result in higher performance, and which may also result in lower power consumption, e.g., because the scheduler 121 is not invoked to process an LCM. As described herein, when the DEC 112 writes the constant to the destination register in the register file 105, the constant is immediately available/ready for any Ops that are dependent upon the constant in the destination register as a source operand, which may advantageously facilitate issuance of the dependent Ops for execution sooner than in a conventional core that does not perform LCM pre-execution.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution. In the case of an LCM, as the DEC 112 writes the constant to the register file 105, the LCM's entry in the ROB 122 is also marked to indicate the Op has completed its execution. The indicator may be used by logic to indicate, within dependent Op scheduler 121 entries, the availability of the LCM constant as a source operand to be read from the register file 105. The ROB 122 retires the LCM after it becomes the oldest outstanding Op.

Figure 2:
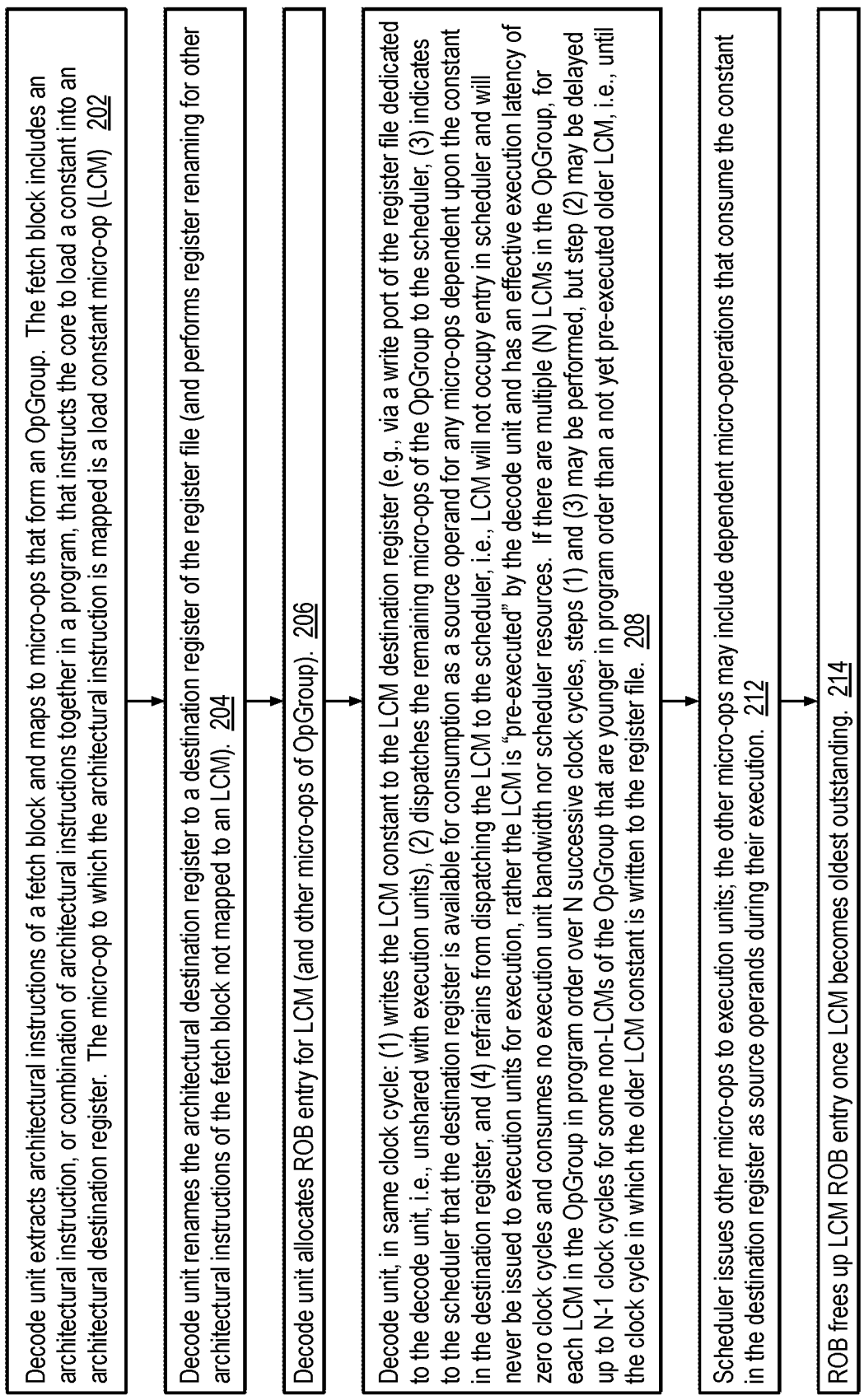
FIG. 2 is an example flow diagram illustrating operation of the processor of FIG. 1 to perform LCM pre-execution in accordance with embodiments of the present disclosure.

FIG. 2 is an example flow diagram illustrating operation of the processor 100 of FIG. 1 to perform LCM pre-execution in accordance with embodiments of the present disclosure. Operation begins at block 202.

At block 202, the DEC 112 extracts architectural instructions of a FBlk and maps the architectural instructions to micro-operations that form an OpGroup. In the example of FIG. 2, the FBlk includes an architectural instruction that instructs the core 100 to load a constant into an architectural destination register, which the DEC 112 maps to an LCM that specifies the constant and a destination register of the register file 105. For example, in the RISC-V ISA, the architectural instruction may be an ADDI rd, x0, imm12, which instructs the core 100 to add a sign-extended 12-bit immediate value (imm12) to the x0 register and load the result into a destination register (rd). The RISC-V ISA defines the x0 register to be hardwired to a value of zero. The 12-bit immediate value (imm12) is embedded within the instruction itself. The destination register (rd) is specified in the instruction, e.g., architectural register x3. Hence, semantically the instruction instructs the core 100 to load the constant formed by the sign-extended imm12 into the architectural destination register. The DEC 112 maps the instruction into an LCM that forms the constant and loads it into the destination register of the register file 105. For another example, the RISC-V architectural instruction LUI rd, imm20 instructs the core 100 to load the 20-bit immediate value (imm20) into the upper 20 bits of the destination register (rd) and fill the lower bits of the destination register with zeros. Hence, semantically the instruction instructs the core 100 to load the constant formed by the zero-lower-extended imm20 into the architectural destination register. The DEC 112 maps the instruction into an LCM that forms the constant and loads it into the destination register of the register file 105. For yet another example, the RISC-V architectural instruction AUIPC rd, imm20 instructs the core 100 to form a 32-bit offset whose upper 20 bits are the 20-bit immediate value (imm20) and whose lower 12 bits are zeros, to add the 32-bit offset to the program counter (PC) value (i.e., the address of AUIPC instruction), and to load the result into the destination register (rd). Hence, semantically the instruction instructs the core 100 to load the sum of the PC and the formed 32-bit offset constant into the architectural destination register. In one embodiment, the DEC 112 has access to the PC value of the AUIPC instruction, and the DEC 112 includes an adder configured to add the PC and one or more constants—in this case the 32-bit offset—to generate a sum. The DEC 112 maps the instruction into an LCM that loads the sum into the destination register of the register file 105.

Further with respect to block 202, in one embodiment the DEC 112 may be configured to map, or fuse, multiple architectural instructions together in a program into an LCM. In one embodiment, the multiple architectural instructions are together in a sequence in the program, i.e., are adjacent. For example, in one embodiment the DEC 112 may map the following sequence of RISC-V instructions into an LCM: LUI rd, imm20 followed by ADDI rd, rd, imm12. Semantically the instruction sequence instructs the core 100 to load into the architectural destination register the constant formed by the concatenation of the 20-bit immediate and the 12-bit immediate. The DEC 112 maps the instruction sequence into an LCM that forms the constant and loads it into the destination register of the register file 105. For another example, in one embodiment the DEC 112 may map the following sequence of RISC-V instructions into an LCM: AUIPC rd, imm20 followed by ADDI rd, rd, imm12. Semantically the instruction sequence instructs the core 100 to load into the architectural destination register the sum of the AUIPC PC value and the constant formed by the concatenation of the 20-bit immediate and the 12-bit immediate. The DEC 112 maps the instruction sequence into an LCM that loads the sum into the destination register of the register file 105. Operation proceeds from block 202 to block 204.

At block 204, the DEC 112 renames the architectural destination register specified by the architectural instruction(s) to a destination register of the register file 105 specified by the LCM. The DEC 112 also performs register renaming for other architectural instructions of the FBlk that are not mapped to an LCM. In one embodiment, the DEC 112 performs renaming (in a manner commonly referred to as physical register file renaming) as follows. The DEC 112 allocates a free register of the register file 105 to each micro-operation to receive the result of the micro-operation, i.e., to be the destination register of the micro-operation, and marks the allocated destination register as having speculative state. Once the micro-operation is committed—which may occur only after there is no longer any possibility of the micro-operation being aborted (because the micro-operation has become the oldest micro-operation or because there is no longer any possibility of any micro-operations older than the micro-operation being aborted)—the allocated destination register is marked as having architectural state. Thus, at any given time, five different registers of the register file 105 allocated to five different micro-operations may be holding speculative state (i.e., potential future architectural state) associated with architectural register r27, for example, while a sixth register of the register file is holding the architectural state associated with architectural register r27. However, other embodiments are contemplated in which the DEC 112 performs renaming in other manners. For example, the register file 105 may include a first fixed set of physical registers that hold architectural state and a second fixed set of physical registers that hold speculative state. During commit of the micro-operation for which the register in the second fixed set was allocated, the DEC 112 copies the speculative state from the allocated register of the second fixed set to the corresponding register of the first fixed set and frees up the register of the second fixed set. Operation proceeds from block 204 to block 206.

At block 206, the DEC 112 allocates an entry in the ROB 122 for each of the micro-operations of the OpGroup, including a ROB 122 entry for the LCM. As described in more detail below, the OpGroup may include more than one LCM. Operation proceeds from block 206 to block 208.

At block 208, the DEC 112 performs the following steps in the same clock cycle (unless there are multiple LCMs in the OpGroup as described more below): (1) the DEC 112 writes the LCM constant to the destination register of the register file 105; (2) dispatches the remaining micro-operations of the OpGroup to the scheduler 121; and (3) indicates to the scheduler 121 that the destination register is available for consumption as a source operand for micro-operations that follow the LCM in program order and are dependent upon the LCM constant in the destination register. Furthermore, (4) the DEC 112 never dispatches the LCM to the scheduler 121 since the LCM is pre-executed by the DEC 112, i.e., the DEC 112 writes the constant to the register file 105. The LCM pre-execution implies that the LCM does not occupy an entry in the scheduler 121 and will not be issued to the execution units 114 to be executed. As a result, the LCM has an effective zero execution latency. That is, any micro-operation that is dependent upon the LCM result (i.e., the constant in the register file 105 destination register) is not kept from immediately issuing because of the LCM (although the dependent micro-operation may be kept from immediately issuing because it is dependent upon a different micro-operation than the lcd for different source operand, or the dependent micro-operation may be kept from immediately issuing because there is no execution unit 114 currently available to execute it). Advantageously, the dependent micro-operations may be in the same OpGroup as the LCM (or in a subsequent OpGroup) and still enjoy the benefit of the zero execution latency of the LCM. Additionally, the LCM consumes no bandwidth of an execution unit 114, and the LCM does not consume scheduler 121 resources, e.g., an entry in the scheduler 121, which may result in lower power consumption.

Further with respect to block 208, as described above, in one embodiment the DEC 112 uses a dedicated write port of the register file 105 to write the LCM constant, i.e., a write port that is not shared with the execution units 114 to write execution results of non-LCMs. In an alternate embodiment, the register file 105 does not include a dedicated write port, and the DEC 112 uses a shared write port of the register file 105 to write the LCM constant, i.e., a write port that is shared with the execution units 114 to write execution results of non-LCMs. In yet another embodiment, the register file 105 includes a dedicated write port, and the DEC 112 is also configured to write a constant to the register file 105 using a shared write port, such that in the case that there are multiple LCMs in the OpGroup, the DEC 112 may concurrently write multiple constants to the register file 105.

In yet another embodiment, the register file 105 includes multiple dedicated write ports useable by the DEC 112 to concurrently write multiple constants to the register file 105. In yet another embodiment, the register file 105 includes N (greater than one but less than the size of an OpGroup) dedicated write ports, and the DEC 112 is configured to concurrently write multiple constants to the register file 105 using the N dedicated write ports and a shared write port. In yet another embodiment, the register file 105 includes N dedicated write ports, where N equals the size of an OpGroup to accommodate a situation in which all the micro-operations of an OpGroup are LCMs.

Further with respect to block 208, as just described, the DEC 112 may detect that there are more than one (N) LCM in the OpGroup. In one embodiment, e.g., an embodiment in which there is only one dedicated register file 105 write port, the DEC 112 may delay dispatching some of the non-LCMs of the OpGroup per step (2) above for N−1 clock cycles. That is, over N successive clock cycles, for each LCM in the OpGroup in program order, the DEC 112 performs steps (1) and (3) above, i.e., writes to the register file 105 the constant associated with the current LCM and indicates to the scheduler 121 that the destination register is available for consumption as a source operand for dependent micro-operations. However, for any non-LCM of the OpGroup younger in program order than an older LCM for which the DEC 112 is not writing the LCM constant in a current clock cycle, the DEC 112 does not dispatch the non-LCM until the clock cycle in which the constant associated with the older LCM is written to the register file 105. The DEC 112 may operate similarly in embodiments with other write port configurations. For example, in an embodiment in which there are multiple (M) total dedicated write ports and/or shared write ports in a given clock cycle, but N is greater than M, the DEC 112 may also delay dispatching younger non-LCMs until the clock cycle in which the LCM constant associated with the older LCM is written to the register file 105. Other embodiments are described below. Operation proceeds from block 208 to block 212.

At block 212, the scheduler 121 issues the other (i.e., non-LCM) micro-operations of the OpGroup (and of other OpGroups) to execution units 114 as they become ready to execute, i.e., when an execution unit 114 is available and when all source operands of the non-LCM are available. Advantageously, in the case of a non-LCM that is dependent upon the LCM, the LCM constant is already available in the destination register, having been written there at block 208, such that the dependent non-LCM may be issued without needing to wait on the constant to be written by an execution unit 114, thereby improving the performance of program execution. Operation proceeds from block 212 to block 214.

At block 214, the ROB 122 frees up the entry allocated at block to the 206 to the LCM when the LCM becomes the oldest outstanding micro-operation.

In the embodiment of FIG. 2, in the case of an OpGroup that includes more than one LCM and less than all of the LCMs may be pre-executed in a single clock cycle, the DEC 112 effectively delays the dispatch of a younger non-LCM until the clock cycle in which all older LCMs are pre-executed. However, other embodiments are contemplated as follows.

In a first alternate embodiment, the DEC 112 may delay dispatch of non-LCMs in the OpGroup only until the clock cycle in which all LCMs in the OpGroup that are older in program order than a given non-LCM, if any, are pre-executed by the DEC 112. To illustrate by example, assume an OpGroup includes micro-operations A, B, C, D in program order, and A and C are LCMs, and B and D are non-LCMs. In the alternate embodiment, in the first clock cycle, the DEC 112 may pre-execute LCM A and dispatch non-LCM B, and in the second clock cycle, the DEC 112 may pre-execute LCM C and dispatch non-LCM D. In a second alternate embodiment similar to the first alternate embodiment, the DEC 112 delays dispatch of a non-LCM on an older LCM in the OpGroup only if the non-LCM is dependent upon the LCM constant of the older LCM. To illustrate by example, assume again an OpGroup includes micro-operations A, B, C, D in program order, and A and C are LCMs, and B and D are non-LCMs, and further assume non-LCM D does not depend upon A or C, then in the first clock cycle, the DEC 112 may pre-execute LCM A and dispatch non-LCM B and non-LCM D, and in the second clock cycle, the DEC 112 may pre-execute LCM C.

In a third alternate embodiment, in the case of an OpGroup that includes more than one LCM and less than all of the LCMs may be pre-executed in a single clock cycle, the DEC 112 may dispatch the additional LCMs to the scheduler 121 to avoid delaying dispatch of the OpGroup. That is, the remaining LCMs of the OpGroup, i.e., the LCMs that are not pre-executed, are dispatched to the scheduler 121 for subsequent issue by the scheduler 121 to an execution unit 114 for execution, rather than being pre-executed. To illustrate by example, assume again an OpGroup includes micro-operations A, B, C, D in program order, and A and C are LCMs, and B and D are non-LCMs, and further assume that only LCM A is able to be pre-executed in the clock cycle (e.g., because the embodiment includes only a single write port dedicated to the DEC 112 and no shared write ports, or includes no dedicated write ports and only one shared write port is available in the clock cycle), then the DEC 112 may pre-execute LCM A and in the same clock cycle dispatch B, C, and D to the scheduler 121.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor having an instruction set architecture (ISA), comprising:
    a register file comprising a plurality of write ports;
    a decode unit configured to map architectural instructions of the ISA into micro-operations and to dispatch the micro-operations to a scheduler;
    the scheduler, configured to issue the micro-operations to execution units for execution; and
    the execution units configured to execute the issued micro-operations by reading source operands from the register file and writing execution results to the register file;
    wherein the ISA includes an architectural instruction that instructs the microprocessor to load a constant into an architectural destination register;
    wherein the decode unit is further configured to:
        map the architectural instruction into a load constant micro-operation (LCM) that specifies the constant and a register of the register file to which the architectural destination register is mapped; and
        write the LCM constant directly to the register of the register file without dispatching the LCM to the scheduler, such that the LCM is not issued to the execution units for execution;
        wherein the decode unit shares at least one of the plurality of write ports of the register file with the execution units to write the LCM constant.

2. The microprocessor of claim 1,
    wherein the decode unit is further configured to, in a same clock cycle that the decode unit writes the LCM constant to the register of the register file, indicate to the scheduler that the LCM constant is available for consumption by dependent micro-operations having a source operand dependency on the register of the register file, such that the LCM imposes zero execution latency on the dependent micro-operations.

3. The microprocessor of claim 2,
    wherein the decode unit is further configured to, in the same clock cycle that the decode unit writes the LCM constant to the register of the register file, dispatch to the scheduler one or more micro-operations other than the LCM; and
    wherein the decode unit is configured to indicate to the scheduler that the LCM constant is available for consumption by dependent micro-operations even if one or more of the other micro-operations dispatched to the scheduler in the same clock cycle that the decode unit writes the LCM constant to the register of the register file is one of the dependent micro-operations.

4. The microprocessor of claim 1,
    wherein, by not being issued to the execution units for execution, the LCM does not consume execution bandwidth of any of the execution units.

5. The microprocessor of claim 1,
    wherein, by not being dispatched to the scheduler, the LCM does not consume resources in the scheduler.

6. The microprocessor of claim 1,
    wherein the plurality of write ports of the register file comprise a dedicated write port used by the decode unit to write the LCM constant, wherein the dedicated write port is not shared with the execution units to write execution results to the register file.

7. The microprocessor of claim 1,
    wherein the ISA includes two or more architectural instructions that, together in a program, instruct the microprocessor to load the constant into the architectural destination register; and
    wherein the decode unit is configured to, when encountering the two or more architectural instructions together in a program, fuse the two or more architectural instructions into the LCM.

8. The microprocessor of claim 7,
    wherein each of two or more of the two or more architectural instructions specifies a component usable to form the constant; and
    wherein to fuse the two or more architectural instructions into the LCM, the decode unit is configured to form the LCM constant using the two or more components.

9. The microprocessor of claim 1,
    wherein the decode unit is further configured to concurrently map a plurality of the instructions of the ISA into a group of micro-operations and to concurrently dispatch the group of micro-operations to the scheduler; and
    wherein the decode unit is further configured to:
        detect that the group of micro-operations includes N LCMs, wherein N is two or more;
        for each LCM of the N LCMs in successive clock cycles, write the LCM constant to the register file; and
        delay, for N−1 clock cycles, dispatching non-LCM of the group to the scheduler.

10. The microprocessor of claim 1,
    wherein the decode unit is further configured to concurrently map a plurality of the instructions of the ISA into a group of micro-operations; and
    wherein the decode unit is further configured to:
        detect that the group of micro-operations includes N LCMs, wherein N is two or more;
        for each LCM of the N LCMs, write the LCM constant to the register file; and
        for each non-LCM in the group, delay dispatch of the non-LCM until the clock cycle in which the decode unit writes the LCM constant to the register file for a last of the LCMs in the group that are older in program order than the non-LCM.

11. The microprocessor of claim 10,
wherein the decode unit is further configured to delay dispatch of the non-LCM only if the non-LCM is dependent upon the LCM constant of the older LCM.

12. The microprocessor of claim 1,
wherein the decode unit is further configured to concurrently map a plurality of the instructions of the ISA into a group of micro-operations; and
wherein the decode unit is further configured to:
  detect that the group of micro-operations includes N LCMs, wherein N is two or more, and that only M write ports are available in a current clock cycle to write the N LCM constants to the register file, wherein M is less than N; and
  write M of the LCM constants to the register file in the current clock cycle.

13. The microprocessor of claim 12,
wherein the decode unit is further configured to:
  dispatch to the scheduler, concurrently in the current clock cycle, the remaining N-M LCMs of the group of micro-operations.

14. The microprocessor of claim 13,
wherein the decode unit is further configured to dispatch to the scheduler,
  concurrently in the current clock cycle, any non-LCMs of the group of micro-operations.

15. The microprocessor of claim 12,
wherein the decode unit is further configured to:
  write to the register file, in one or more clock cycles subsequent to the current clock cycle, the LCM constants of the remaining N-M LCMs of the group of micro-operations.

16. The microprocessor of claim 1,
wherein the plurality of write ports of the register file comprise one or more dedicated write ports used by the decode unit to write the LCM constant, wherein the dedicated write ports are not shared with the execution units to write execution results to the register file,
wherein one or more of the remaining write ports of the plurality of write ports are shared by the decode unit with the execution units;
wherein the decode unit is further configured to concurrently map a plurality of the instructions of the ISA into a group of micro-operations and to concurrently dispatch the group of micro-operations to the scheduler; and
wherein the decode unit is further configured to:
  detect that the group of micro-operations includes at least two LCMs; and
  concurrently:
    write the LCM constant of at least a first in program order of the at least two LCMs to the register file using at least one of the one or more dedicated write ports; and
    write the LCM constant of at least a second in program order of the at least two LCMs to the register file using at least one of the one or more shared write ports.

17. The microprocessor of claim 1,
wherein the decode unit is configured to rename the architectural destination register to the register of the register file to which the decode unit subsequently writes the LCM constant.

18. A method, comprising:
in a microprocessor having an instruction set architecture (ISA) that includes an architectural instruction that instructs the microprocessor to load a constant into an architectural destination register, the microprocessor comprising:
  a register file comprising a plurality of write ports;
  a decode unit configured to map architectural instructions of the ISA into micro-operations and to dispatch the micro-operations to a scheduler;
  the scheduler, configured to issue the micro-operations to execution units for execution; and
  the execution units configured to execute the issued micro-operations by reading source operands from the register file and writing execution results to the register file;
mapping, by the decode unit, the architectural instruction into a load constant micro-operation (LCM) that specifies the constant and a register of the register file to which the architectural destination register is mapped; and
writing, by the decode unit, the LCM constant directly to a register of the register file without dispatching the LCM to the scheduler, such that the LCM is not issued to the execution units for execution;
wherein the decode unit shares at least one of the plurality of write ports with the execution units to write the LCM constant.

19. The method of claim 18, further comprising:
indicating, by the decode unit in a same clock cycle that the decode unit writes the LCM constant to the register of the register file, to the scheduler that the LCM constant is available for consumption by dependent micro-operations having a source operand dependency on the register of the register file, such that the LCM imposes zero execution latency on the dependent micro-operations.

20. The method of claim 19, further comprising:
dispatching, by the decode unit in the same clock cycle that the decode unit writes the LCM constant to the register of the register file, to the scheduler one or more micro-operations other than the LCM; and
said indicating, by the decode unit, to the scheduler that the LCM constant is available for consumption by dependent micro-operations even if one or more of the other micro-operations dispatched to the scheduler in the same clock cycle that the decode unit writes the LCM constant to the register of the register file is one of the dependent micro-operations.

21. The method of claim 18,
wherein, by not being issued to the execution units for execution, the LCM does not consume execution bandwidth of any of the execution units.

22. The method of claim 18,
wherein, by not being dispatched to the scheduler, the LCM does not consume resources in the scheduler.

23. The method of claim 18,
wherein the plurality of write ports of the register file comprise a dedicated write port used by the decode unit to write the LCM constant, wherein the dedicated write port is not shared with the execution units to write execution results to the register file.

24. The method of claim 18, further comprising:
wherein the ISA includes two or more architectural instructions that, together in a program, instruct the microprocessor to load the constant into the architectural destination register;

fusing, by the decode unit when encountering the two or more architectural instructions together in a program, the two or more architectural instructions into the LCM.

25. The method of claim 24,
wherein each of two or more of the two or more architectural instructions specifies a component usable to form the constant; and
wherein said fusing the two or more architectural instructions into the LCM comprises forming the LCM constant using the two or more components.

26. The method of claim 18, further comprising:
wherein the decode unit is further configured to concurrently map a plurality of the instructions of the ISA into a group of micro-operations and to concurrently dispatch the group of micro-operations to the scheduler;
detecting, by the decode unit, that the group of micro-operations includes N LCMs, wherein N is two or more;
for each LCM of the N LCMs in successive clock cycles, writing, by the decode unit, the LCM constant to the register file; and
delaying, by the decode unit for N−1 clock cycles, dispatching non-LCMs of the group to the scheduler.

27. The method of claim 18, further comprising:
wherein the decode unit is further configured to concurrently map a plurality of the instructions of the ISA into a group of micro-operations; and
detecting, by the decode unit, that the group of micro-operations includes N LCMs, wherein N is two or more;
for each LCM of the N LCMs, writing, by the decode unit, the LCM constant to the register file; and
for each non-LCM in the group, delaying, by the decode unit, dispatching of the non-LCM until the clock cycle in which the decode unit writes the LCM constant to the register file for a last of the LCMs in the group that are older in program order than the non-LCM.

28. The method of claim 27,
wherein the decode unit delays dispatching of the non-LCM only if the non-LCM is dependent upon the LCM constant of the older LCM.

29. The method of claim 18, further comprising:
wherein the decode unit is further configured to concurrently map a plurality of the instructions of the ISA into a group of micro-operations; and
detecting, by the decode unit, that the group of micro-operations includes N LCMs, wherein N is two or more, and that only M write ports are available in a current clock cycle to write the N LCM constants to the register file, wherein M is less than N; and
writing, by the decode unit, M of the LCM constants to the register file in the current clock cycle.

30. The method of claim 29, further comprising:
dispatching to the scheduler, by the decode unit concurrently in the current clock cycle, the remaining N-M LCMs of the group of micro-operations.

31. The method of claim 30, further comprising:
dispatching to the scheduler, by the decode unit concurrently in the current clock cycle, any non-LCMs of the group of micro-operations.

32. The method of claim 29, further comprising:
writing to the register file, by the decode unit in one or more clock cycles subsequent to the current clock cycle, the LCM constants of the remaining N-M LCMs of the group of micro-operations.

33. The method of claim 18, further comprising:
wherein the plurality of write ports of the register file comprise one or more dedicated write ports used by the decode unit to write the LCM constant, wherein the dedicated write ports are not shared with the execution units to write execution results to the register file, wherein one or more of the remaining write ports of the plurality of write ports are shared by the decode unit with the execution units; and
wherein the decode unit is further configured to concurrently map a plurality of the instructions of the ISA into a group of micro-operations and to concurrently dispatch the group of micro-operations to the scheduler;
detecting, by the decode unit, that the group of micro-operations includes at least two LCMs; and
concurrently, by the decode unit:
writing, by the decode unit, the LCM constant of at least a first in program order of the at least two LCMs to the register file using at least one of the one or more dedicated write ports; and
writing, by the decode unit, the LCM constant of at least a second in program order of the at least two LCMs to the register file using at least one of the one or more shared write ports.

34. The method of claim 18, further comprising:
renaming, by the decode unit, the architectural destination register to the register of the register file to which the decode unit subsequently writes the LCM constant.

35. A non-transitory computer-readable medium having instructions stored thereon that are capable of causing or configuring a microprocessor having an instruction set architecture (ISA) comprising:
a register file comprising a plurality of write ports;
a decode unit configured to map architectural instructions of the ISA into micro-operations and to dispatch the micro-operations to a scheduler;
the scheduler, configured to issue the micro-operations to execution units for execution; and
the execution units configured to execute the issued micro-operations by reading source operands from the register file and writing execution results to the register file;
wherein the ISA includes an architectural instruction that instructs the microprocessor to load a constant into an architectural destination register;
wherein the decode unit is further configured to:
map the architectural instruction into a load constant micro-operation (LCM) that specifies the constant and a register of the register file to which the architectural destination register is mapped; and
write the LCM constant directly to a register of the register file without dispatching the LCM to the scheduler, such that the LCM is not issued to the execution units for execution;
wherein the decode unit shares at least one of the plurality of write ports of the register file with the execution units to write the LCM constant.

* * * * *

UNITED STATES PATENT AND TRADEMARK OFFICE
CERTIFICATE OF CORRECTION

| | | |
|---|---|---|
| PATENT NO. | : 12,001,843 B2 | Page 1 of 1 |
| APPLICATION NO. | : 17/945492 | |
| DATED | : June 4, 2024 | |
| INVENTOR(S) | : John G. Favor and David S. Oliver | |

It is certified that error appears in the above-identified patent and that said Letters Patent is hereby corrected as shown below:

In the Claims

1. In Column 12, Line 48, in Claim 9, delete "Nis" and insert -- N is --, therefor.

2. In Column 12, Line 60, in Claim 10, delete "Nis" and insert -- N is --, therefor.

3. In Column 13, Line 11, in Claim 12, delete "Nis" and insert -- N is --, therefor.

4. In Column 13, Lines 26-27, in Claim 14, delete "concurrently in the ......... micro-operations." and insert the same on Line 25, as a continuation point.

5. In Column 13, Lines 40-42, in Claim 16, delete "wherein one or more ......... with the execution units;" and insert the same on Line 39, as a continuation point.

Signed and Sealed this
Sixteenth Day of July, 2024

Katherine Kelly Vidal
*Director of the United States Patent and Trademark Office*